United States Patent
Hahn et al.

(10) Patent No.: US 12,340,121 B2
(45) Date of Patent: Jun. 24, 2025

(54) DATA STORAGE DEVICE AND METHOD FOR LOGICAL RANGE LOCK

(71) Applicant: Sandisk Technologies, Inc., Milpitas, CA (US)

(72) Inventors: Judah Gamliel Hahn, Ofra (IL); Ramanathan Muthiah, Bangalore (IN); Daniel J. Linnen, Naperville, IL (US)

(73) Assignee: Sandisk Technologies, Inc., Milpitas, CA (US)

(*) Notice: Subject to any disclaimer, the term of this patent is extended or adjusted under 35 U.S.C. 154(b) by 7 days.

(21) Appl. No.: 18/224,856

(22) Filed: Jul. 21, 2023

(65) Prior Publication Data

US 2024/0361957 A1 Oct. 31, 2024

Related U.S. Application Data

(60) Provisional application No. 63/462,785, filed on Apr. 28, 2023.

(51) Int. Cl.
*G06F 3/06* (2006.01)

(52) U.S. Cl.
CPC ............ *G06F 3/0659* (2013.01); *G06F 3/061* (2013.01); *G06F 3/064* (2013.01); *G06F 3/0679* (2013.01)

(58) Field of Classification Search
CPC ........ G06F 3/0659; G06F 3/061; G06F 3/064; G06F 3/0679
See application file for complete search history.

(56) References Cited

U.S. PATENT DOCUMENTS

| | | | |
|---|---|---|---|
| 8,392,683 B1* | 3/2013 | Confalonieri | G06F 12/0246 711/163 |
| 11,093,161 B1* | 8/2021 | Chen | G06F 3/0619 |
| 2017/0357571 A1* | 12/2017 | Souri | G06F 12/0246 |
| 2018/0181328 A1* | 6/2018 | Espeseth | G06F 9/5083 |
| 2023/0297246 A1* | 9/2023 | Nagai | G06F 3/0659 711/154 |

* cited by examiner

*Primary Examiner* — Francisco A Grullon
(74) *Attorney, Agent, or Firm* — Crowell & Moring LLP (57) ABSTRACT

When copy commands are queued in a submission queue, there can potentially be many queued input-output (I/O) commands directed to the same logical range as the queued commands. This can result in data being invalidated immediately after it is written in memory, leading to write amplification and inefficient backend processing. To address this problem, the embodiments presented herein can be used to lock the range of logical block addresses of the queued commands, so that I/O commands are prevented from accessing the range of logical block addresses until the queued copy commands are completed.

20 Claims, 10 Drawing Sheets

DATA STORAGE DEVICE AND METHOD FOR LOGICAL RANGE LOCK

CROSS-REFERENCE TO RELATED APPLICATION

This application claims priority to U.S. provisional patent application No. 63/462,785, filed Apr. 28, 2023, which is hereby incorporated by reference.

BACKGROUND

A copy command can be used to copy data from one logical block to another in a memory of a data storage device. When copy commands are queued in a submission queue, there can potentially be many queued input-output (I/O) commands directed to the same logical range as the queued copy commands. This can result in data being invalidated immediately after it is written in memory, leading to write amplification and inefficient backend processing.

DETAILED DESCRIPTION

The following embodiments generally relate to a data storage device and method for logical range lock. In one embodiment, a data storage device is provided comprising a non-volatile memory and a controller coupled with the non-volatile memory. The controller is configured to: determine a range of destination logical addresses associated with at least one command that changes a logical address of data stored in the memory; and postpone input-output commands that access the range of destination logical addresses until the at least one command is completed.

In another embodiment, a method is provided that is performed in a data storage device comprising a non-volatile memory. The method comprises: identifying that a command is present in a submission queue; in response to determining that the command is present in the submission queue, searching the submission queue and/or other submission queues to identify other commands of a same type; determining a range of destination addresses associated with the identified commands; and preventing commands other than the identified commands from accessing the range of destination addresses until the identified commands are complete.

In yet another embodiment, a data storage device is provided comprising: a memory; range lock means for postponing execution of input-output commands that access a range of destination logical block addresses in the memory that are subject to a copy or dataset management command; and speculative range lock means for postponing execution of input-output commands that access a range of source logical block addresses in the memory that are subject to a copy or dataset management command.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
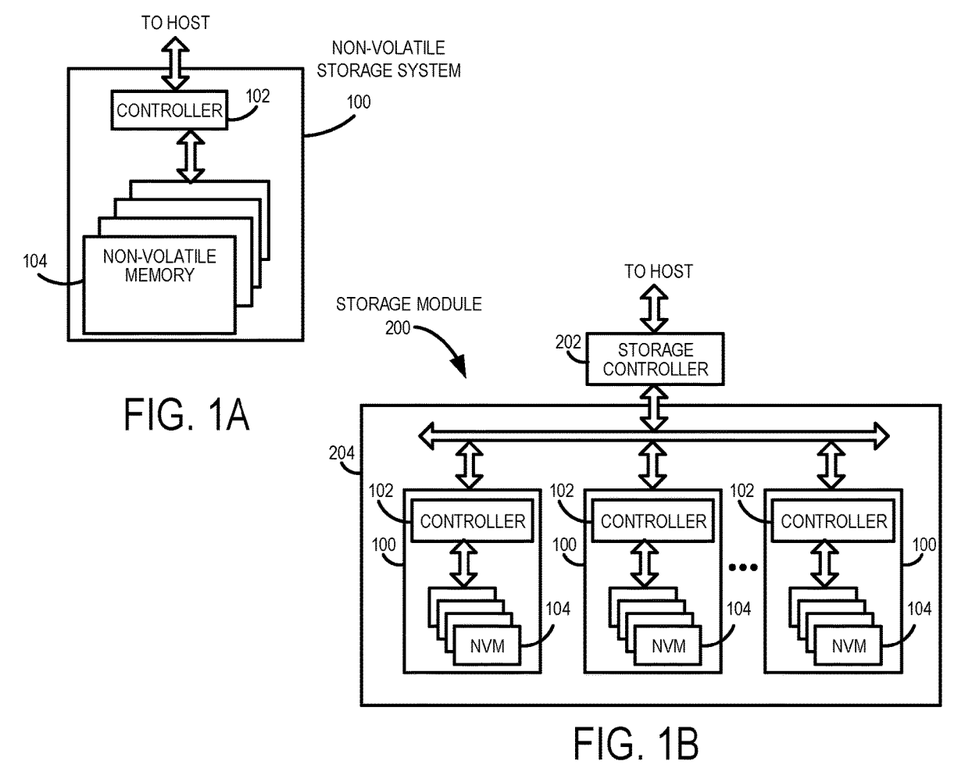
FIG. 1A is a block diagram of a data storage device of an embodiment.
FIG. 1B is a block diagram illustrating a storage module of an embodiment.
Figure 1C:
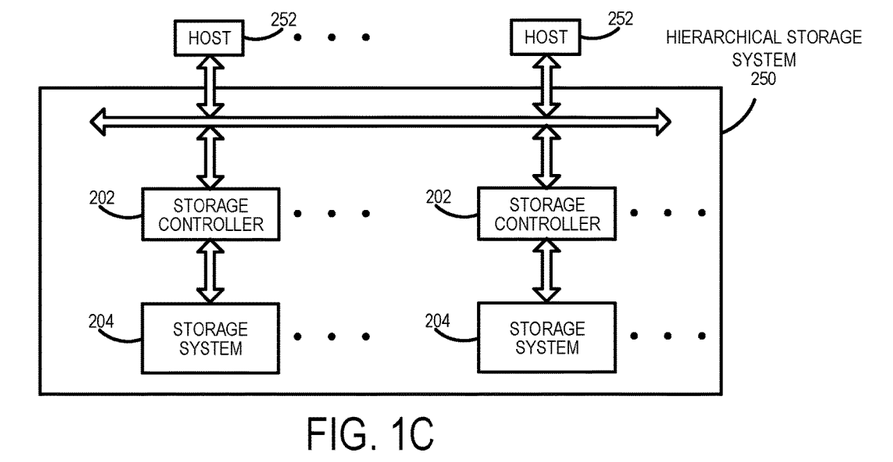
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
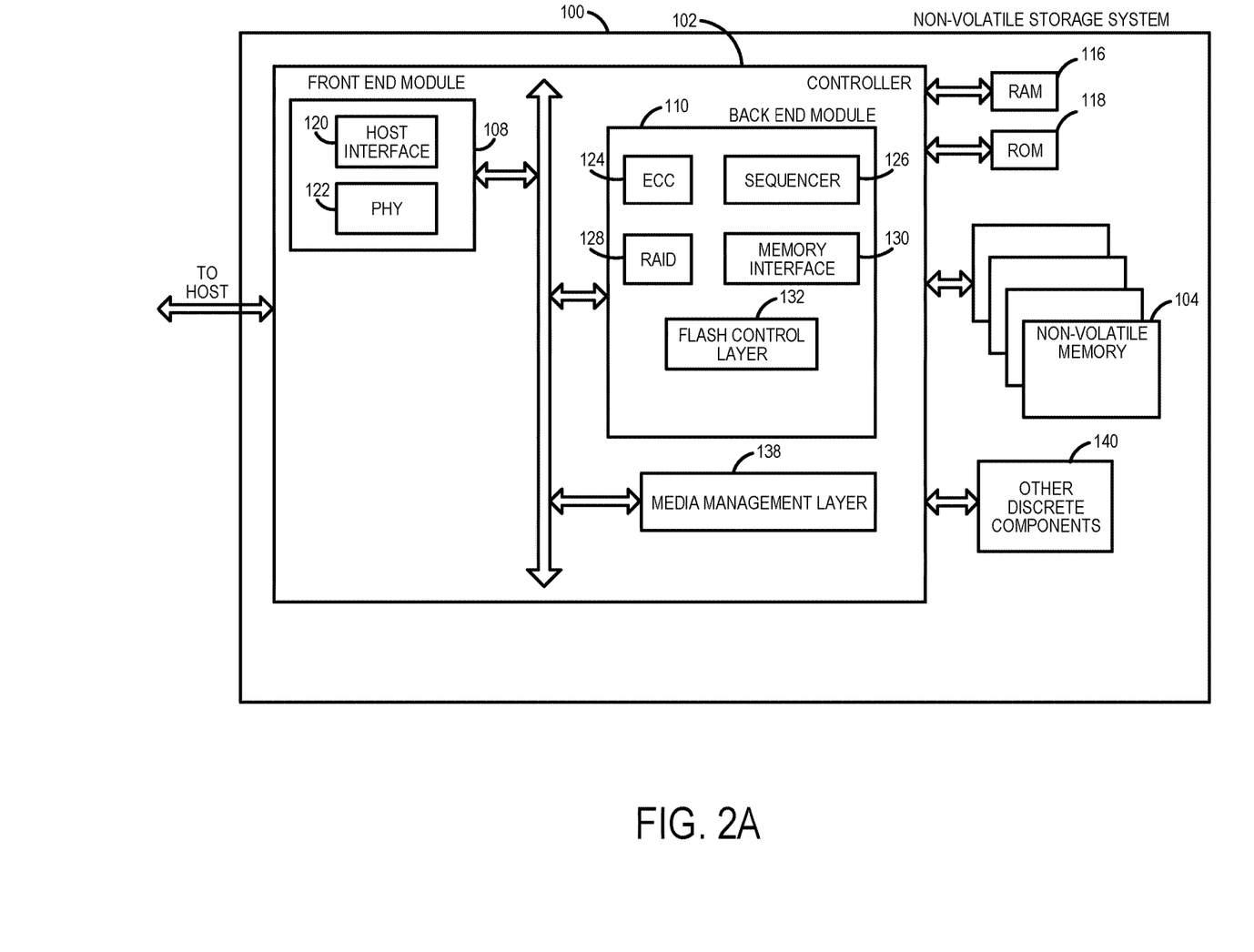
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
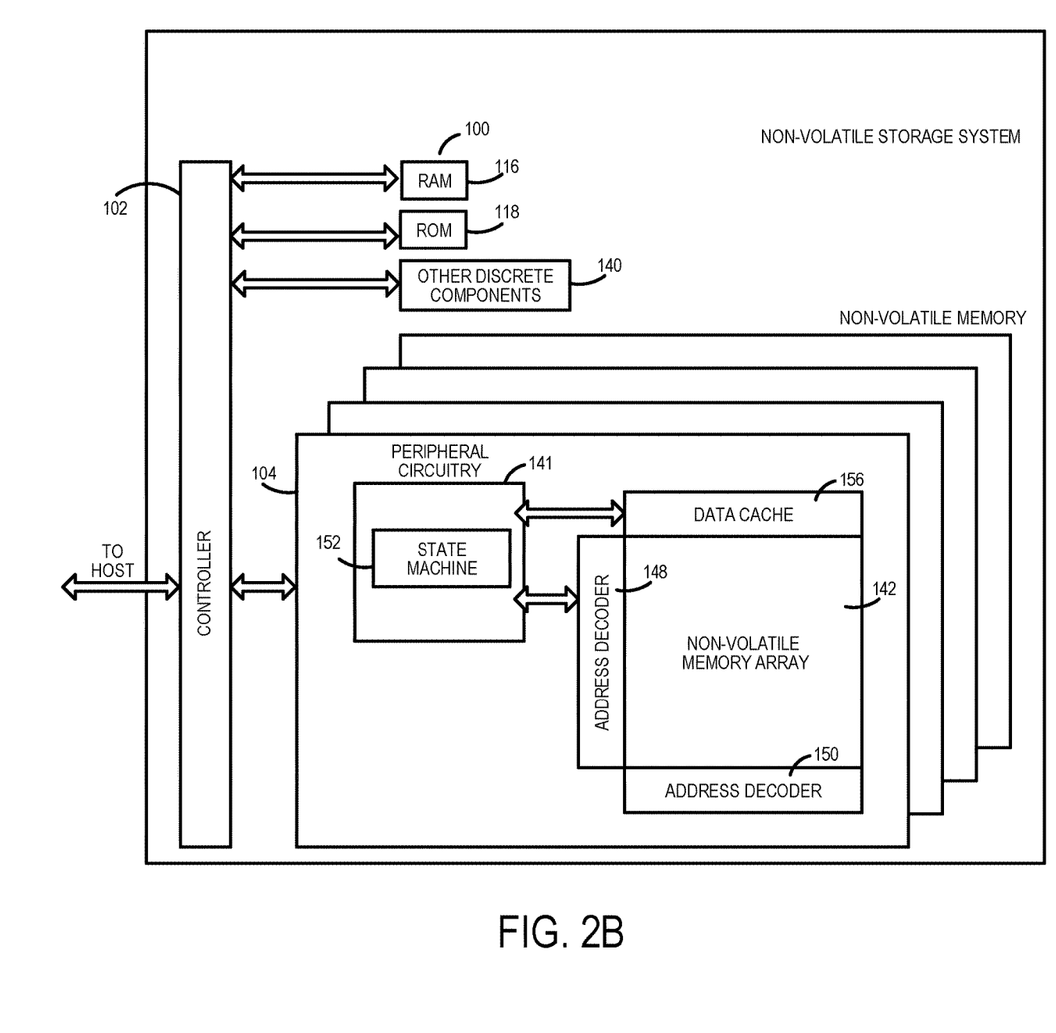
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
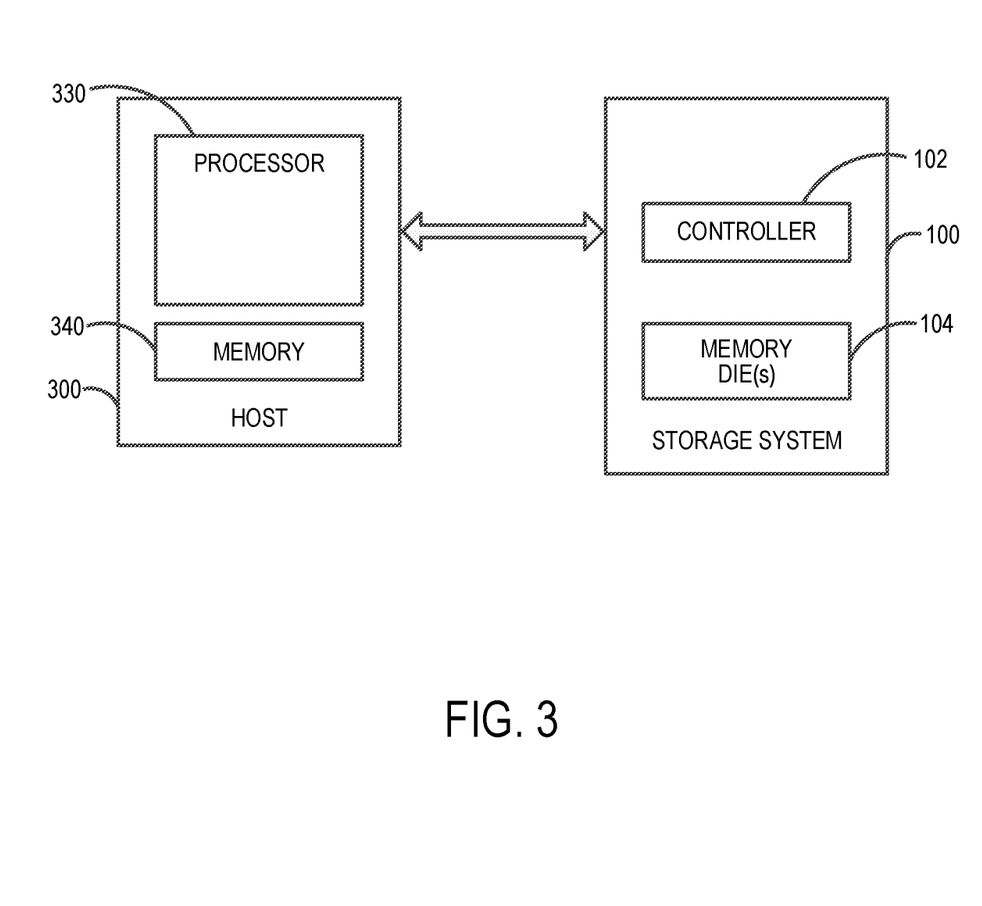
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In one embodiment, the data storage device 100 and host 300 operate under the Non-Volatile Memory Express (NVMe) specification. NVMe is based on a paired submission and completion queue mechanism. Commands are placed by host software into a submission queue (SQ), and completions are placed into the associated completion queue (CQ) by the controller 102 of the data storage device 100. As mentioned above, when copy commands are queued in the submission queue, there can potentially be many input-output (I/O) commands in one or many other submission queues in the same logical range. This can invalidate logical data in the data storage device 100 immediately after writes, leading to write amplification and inefficient backend processing. The following embodiments can be used to synchronize and optimize backend processing based on available information.

In general, these embodiments provide for a "range lock" feature. With the range lock feature, when one or more copy commands are submitted, the controller 102 of the data storage device 100 can allow multiple copy commands to run in sequence and stall other I/O commands to the same destination logical block address (LBA) range of the copy commands until all of the copy commands complete (since I/O writes to that range would be invalidated because of the copy commands). This minimizes garbage collection workload, reduces write amplification, and, hence, enhances quality of service (QOS). Additionally and independently, for any logical erase/trim/deallocate commands received from the host 300, the controller 102 can stall I/O host commands until the logical erase/trim/deallocate commands are completed.

Further, leveraging the fact that the source address range can potentially get invalidated after a copy command, the following embodiments can be used to provide a "speculative range lock" feature once a copy command is received. More specifically, the controller 102 (e.g., a flash translation layer (FTL) module in the controller 102) can reprioritize blocks and control data associated with a source LBA range by proactively creating a range lock with the source LBA range in the copy command, speculating that the source LBA range can potentially get invalidated. This optimizes garbage collection overhead if the speculation becomes true. Since this step is based on speculation, there is no hard time constraint to delay garbage collection for blocks associated with this LBA range, and the controller 102 can postpone the activity as much as the system allows. For example, if there are other blocks available as candidates for garbage collection, a particular metablock can be postponed expecting data invalidation in it shortly.

Irrespective of whether the range lock is created for copy or trim or a speculative range lock, the controller 102 can re-prioritize (or postpone) the garbage collection of source blocks if the controller 102 determines that the source addresses are in the ""range lock," which would reduce garbage collection overhead. Additionally or alternatively, the controller 102 can reprioritize (or postpone) logical-to-physical (L2P) address translation table updates for control pages associated with the logical space clashing with the "range lock," which would reduce control overhead. The range lock and speculative range lock can be independently activated or deactivated by the data storage device 100. Also, in some cases, range lock may be applied only when the I/O command length is more than a threshold.

Figure 4:
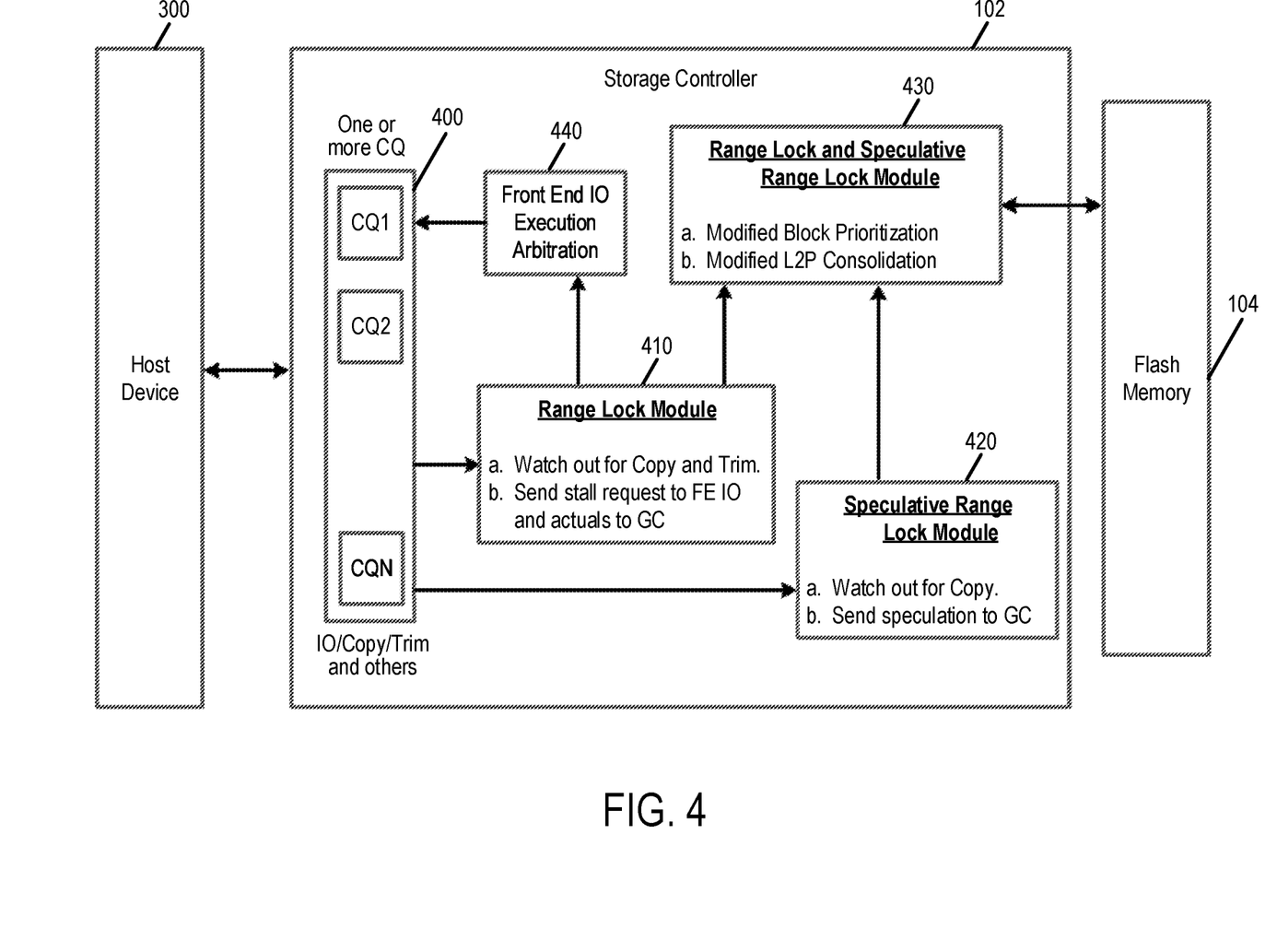
FIG. 4 is a block diagram showing example components of a controller of a data storage device of an embodiment.

Turning again to the drawings, FIG. 4 is a block diagram that shows example components of the controller 102. It should be understood that this is merely an example and that other/different components can be used. As shown in FIG. 4, in this example, the controller 102 comprises one or more complete queues (CQs) 400 (e.g., for storing completion flags for I/O, copy, trim, and other commands), a range lock module 410, a speculative range lock module 420, a range lock module and speculative range lock module 430, and front end I/O execution arbitration module 440. The range lock module 410 is configured to watch out for copy and trim commands and sends a stall request to the front end I/O module 440 and a garbage collection module (not shown). The speculative range lock module 420 is configured to watch out for copy commands and to send a speculation indication to the garbage collection module. The range lock module and speculative range lock module 430 is configured to generate a modified block prioritization and to generate a modified logical-to-physical address consolidation.

In operation, on receiving a copy command, the controller 102 can first create a range lock tagged with a destination address range of the copy command. The copy command contains current data invalidation in the destination range. After the range is locked, the controller 102 can allow multiple copy commands to run in sequence and stall other I/O commands to the same address range until all of the copy commands complete. This way, the overheads or rework related to host I/O commands is kept to a minimum in the backend of the data storage device 100.

The range lock can be further used to optimize garbage collection and control overhead. The controller 102 can do this, for example, using a reverse physical-to-logical address (P2L) mapping table, which has logical address details of fragments in each metablock. For example, once a source block is chosen, the controller 102 can check the P2L page of the associated source block and verify if any of the logical addresses in the P2L table is in the range lock. If the controller 102 determines that any entries are present, the controller 102 can simply re-circulate the block in the same queue, thereby postponing garbage collection. This can allow the data to settle down in that block and save on garbage collection effort, which can include moving the host data from one block to other and the associated control overhead to mark the data movement. Control overhead includes fetching the control page from the flash block and flushing it back after updating it. Minimizing the garbage collection and control overheads can enhance backend quality of service as well as reduce write amplification in the memory 104.

The concept of range lock with copy can be applied to host trim commands, which may also be referred to as a logical erase command, a deallocate command, or a dataset management command. For example, on receiving a trim command (while the trim command is in the submission queue and still unprocessed), the controller 102 can perform a range lock of logical addresses associated with the trim command. Once the range lock is triggered for the trim command, the controller 102 can take the same steps to save on garbage collection time, as mentioned above.

Also, the L2P delta flush is a flow in storage architectures to cache the L2P updates temporarily in volatile memory (e.g., RAM). Once a threshold number of entries are accumulated to a particular L2P page, the page is fetched, updated with the accumulated entries, and finally flushed to the non-volatile memory 104. This keeps the control overhead minimal. Using these embodiments, when the L2P delta flush flow is to be triggered, the controller 102 can, as an intermediate step, determine if there are any range lock that is defined, and, if so, if the range lock clashes with the L2P page that is to be consolidated. If there is a clash, the controller 102 can reprioritize that L2P page update for another L2P page for a threshold amount of time. This way, the control overheads can also be optimized by avoiding any L2P rework in the backend.

It may be noted that a copy command's destination invalidates the existing range. It is also a sign of "speculative invalidation of source range." So, after a copy, the controller 102 can potentially invalidate the source address range (because the host chose to perform the copy). Accordingly, in another embodiment, the speculation can be taken advantage of, and the controller 102 can reprioritize blocks and control data associated with a source range by creating a range lock with the source addresses. By providing time, the controller 102 can wait for some data to automatically get invalidated in the source range as well, which subsequently can minimize the garbage collection efforts further. On the other hand, if the speculation fails, there is no harm with the functionality, and only the garbage collection ordering would differ for metablocks. So, this can be considered a "no-risk" item, and the controller 102 has nothing to lose if the speculation fails.

Figure 5:
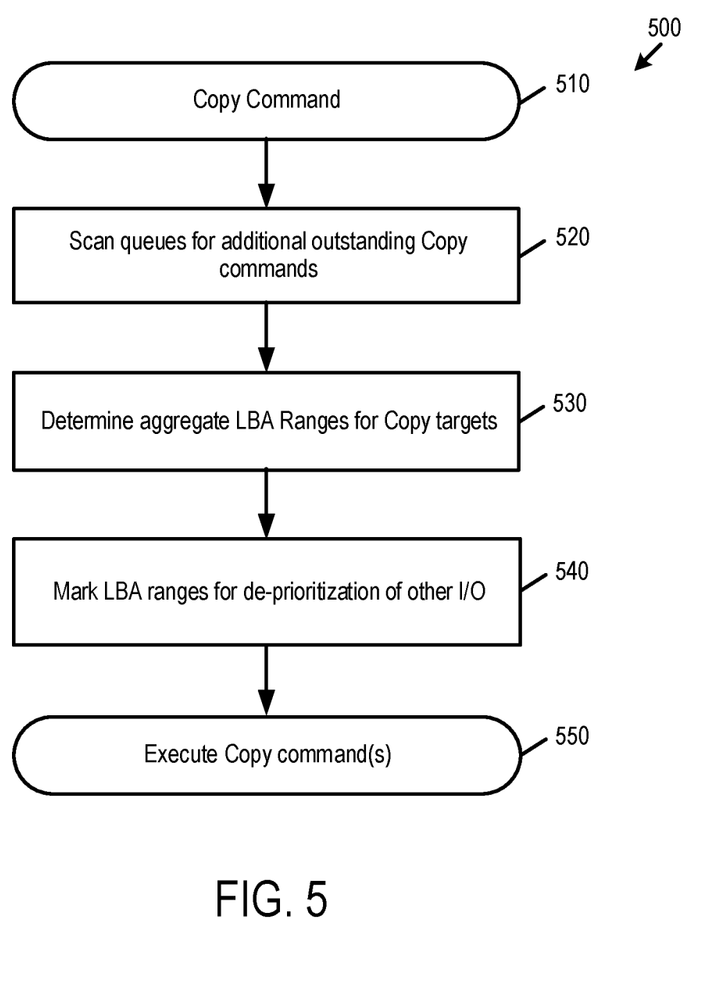
FIG. 5 is a flow chart of a method of an embodiment for executing a copy command.

Turning again to the drawings, FIGS. 5-9 are flow charts that illustrate some of the methods discussed above. FIG. 5 is a flow chart 500 of a method of an embodiment for executing a copy command. As shown in FIG. 5, after a copy command is received (act 510), the controller 102 scans the submission queues for additional outstanding copy commands (act 520). The controller 102 then determines an aggregate LBA for the copy targets (act 530) and marks the LBA ranges for de-prioritization of other I/O commands (act 540). The controller 102 then executes the copy command(s) (act 550).

Figure 6:
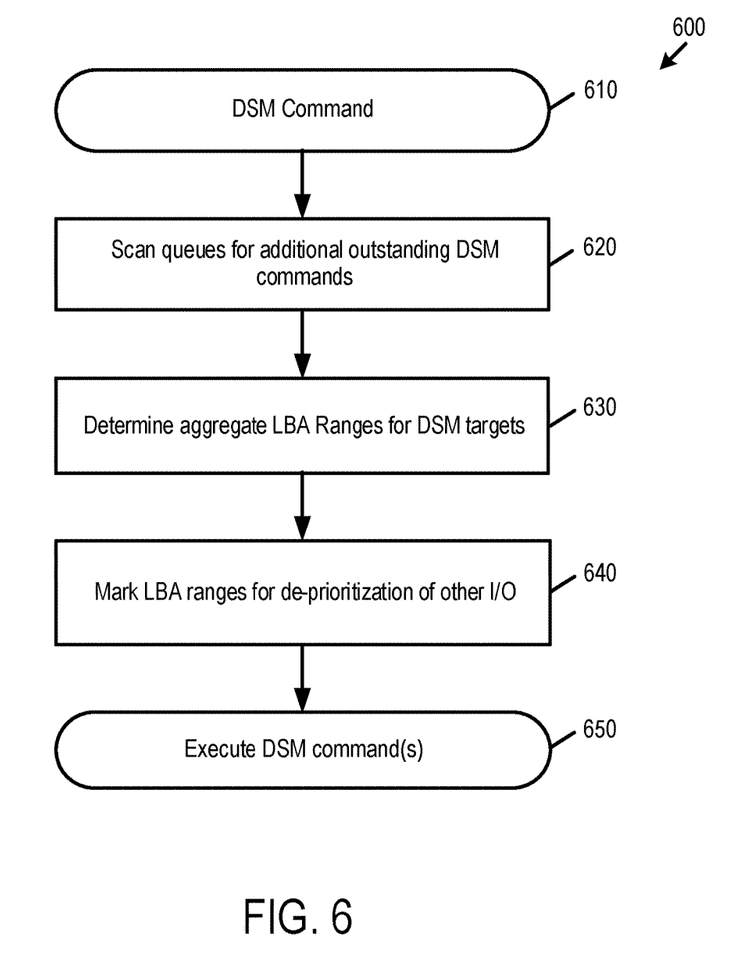
FIG. 6 is a flow chart of a method of an embodiment for executing a dataset management (DSM) command.

FIG. 6 is a flow chart 600 of a method of an embodiment for executing a dataset management (DSM) command, such as a trim or deallocate command. As shown in FIG. 6, after a DSM command is received (act 610), the controller 102 scans the submission queues for additional outstanding DSM commands (act 620). The controller 102 then determines an aggregate LBA for the DSM targets (act 630) and marks the LBA ranges for de-prioritization of other I/O commands (act 640). The controller 102 then executes the DSM command(s) (act 650).

Figure 7:
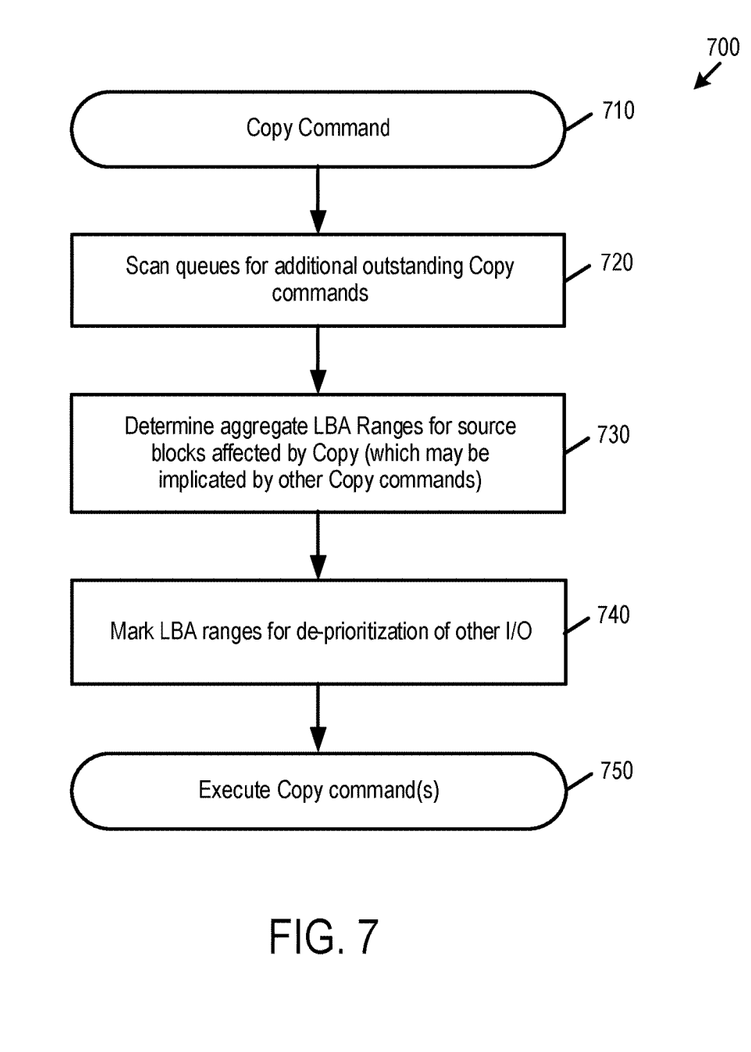
FIG. 7 is a flow chart of a method of an embodiment for executing a copy command.

FIG. 7 is a flow chart 700 of a method of an embodiment for executing a copy command. As shown in FIG. 7, after a copy command is received (act 710), the controller 102 scans the submission queues for additional outstanding copy commands (act 720). The controller 102 then determines an aggregate LBA for the source blocks affected by the copy command, which may be implicated by other copy commands) (act 730). Then, the controller 102 marks the LBA ranges for de-prioritization of other I/O commands (act 740) and executes the copy command(s) (act 750).

Figure 8:
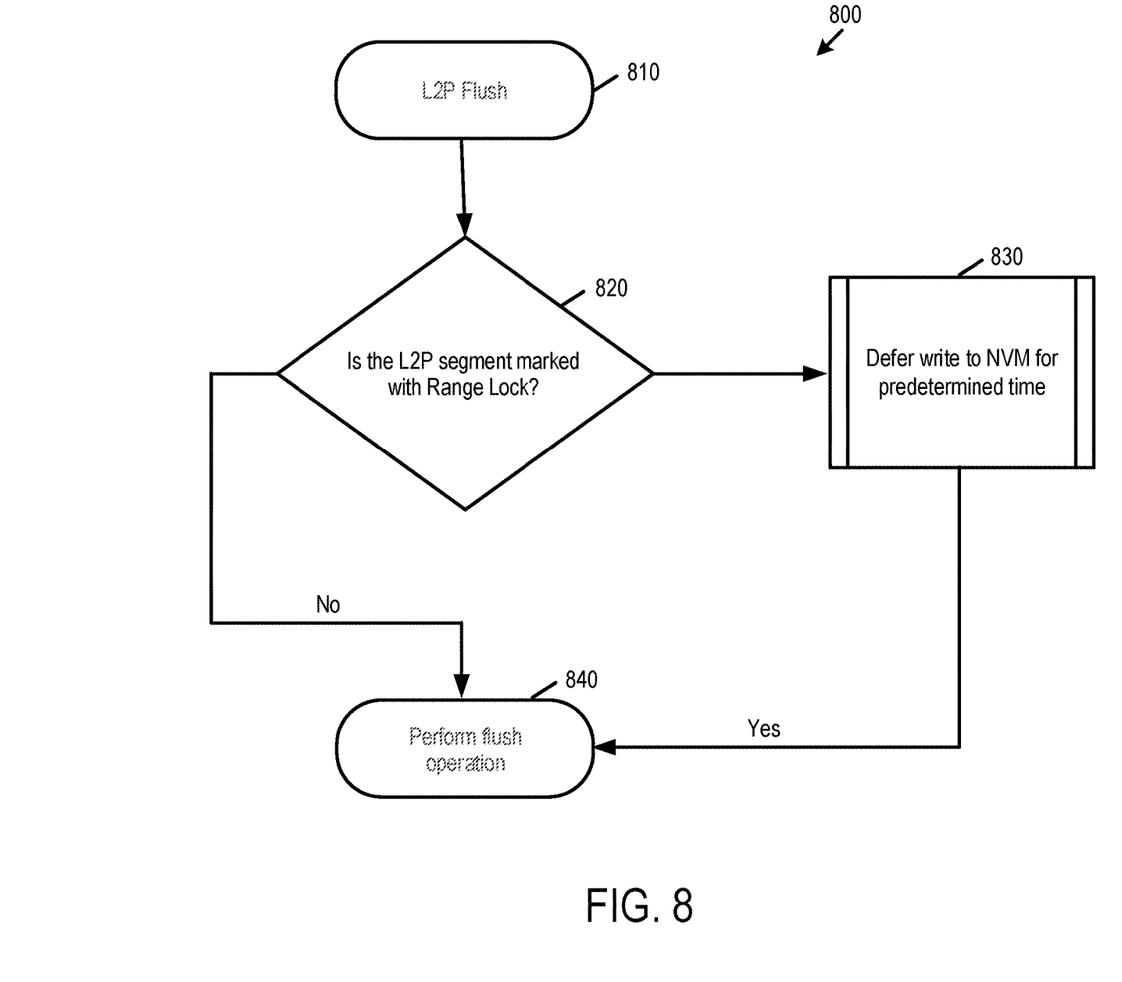
FIG. 8 is a flow chart of a method of an embodiment for performing a flush operation.

FIG. 8 is a flow chart 800 of a method of an embodiment for performing a flush operation. As shown in FIG. 8, in response to a L2P flush command (which can be an implied operation triggered by the host 300 or internal device 100 activity (e.g., a certain threshold of write commands, a flush command from the host 300, a period of idle time, or other device-specific triggers)) (act 810), the controller 102 determines if the L2P segment is marked in the range lock (act 820). If it is not, the controller 102 performs the flush operation (act 840). However, if it is, the controller 102 defers the write to the non-volatile memory 104 for a predetermined time (act 830).

Figure 9:
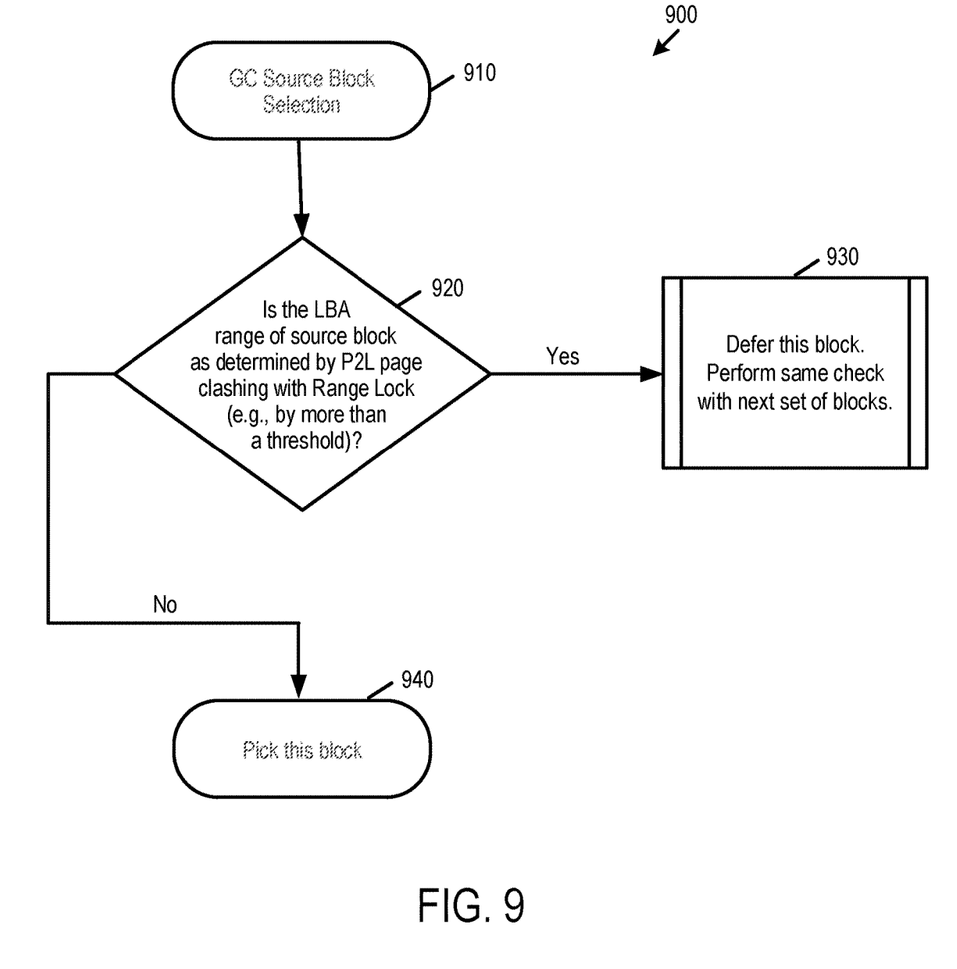
FIG. 9 is a flow chart of a method of an embodiment for selecting a garbage collection source block.

FIG. 9 is a flow chart 900 of a method of an embodiment for selecting a garbage collection source block. As shown in FIG. 9, in response to a request to select a garbage collection source block (which can be a device-internal operation (e.g., due to idle time, a drop in available free blocks below a device-specific threshold, an explicit host command to perform maintenance activities, or other device-specific triggers) (act 910), the controller 102 determines if the LBA range of the source block as determined by the P2L page clashes with the range lock (e.g., by more than a threshold) (act 920). If it does not, the controller 102 picks the block (act 940). However, if it does, the controller 102 defers this block and performs the same check with the next set of blocks (act 930).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a non-volatile memory; and
   a processor coupled with the non-volatile memory and configured to:
   determine a range of destination logical addresses of copy commands in at least one queue;
   de-prioritize other commands in the at least one queue that, when executed, would access the range of destination logical addresses, wherein de-prioritizing the other commands postpones execution of the other commands until after the copy commands are completed; and
   execute the copy commands;
   wherein execution of the copy commands invalidates data in the range of destination logical addresses, and wherein postponing execution of the other commands until after the copy commands are completed avoids the copy commands invalidating data written in the range of destination logical addresses by the other commands.

2. The data storage device of claim 1, wherein the processor is further configured to:
   determine a range of source logical addresses of the copy commands; and
   postpone execution of input-output commands that, when executed, would access the range of source logical addresses, wherein the execution of the input-outcome commands is postponed until after the copy commands are completed.

3. The data storage device of claim 1, wherein the processor is further configured to:
   use physical-to-logical address mapping to determine whether a physical block in the non-volatile memory maps to the range of destination logical addresses; and
   in response to the physical block not mapping to the range of destination logical addresses, select the physical block as a source block for garbage collection.

4. The data storage device of claim 3, wherein the processor is further configured to:
   in response to the physical block mapping to the range of destination logical addresses, postpone selecting the physical block as the source block for garbage collection.

5. The data storage device of claim 1, wherein the processor is further configured to:
   determine whether a logical address in an entry in a logical-to-physical address translation table stored in a volatile memory of the data storage device is in the range of destination logical addresses; and
   in response to determining that the logical address is not in the range of destination logical addresses, flush the entry from the volatile memory to the non-volatile memory.

6. The data storage device of claim 5, wherein the processor is further configured to:
   in response to determining that the logical address is in the range of destination logical addresses, defer flushing the entry from the volatile memory to the non-volatile memory.

7. The data storage device of claim 1, wherein the copy commands are identified by searching the at least one queue after receiving a copy command.

8. The data storage device of claim 1, wherein the at least one queue is in the data storage device.

9. The data storage device of claim 1, wherein the non-volatile memory comprises a three-dimensional memory.

10. In a data storage device comprising a non-volatile memory, a method comprising:
    determining a range of destination logical addresses of dataset management commands in at least one queue;
    de-prioritizing other commands in the at least one queue that, when executed, would access the range of destination logical addresses, wherein de-prioritizing the other commands postpones execution of the other commands until after the dataset management commands are completed; and
    executing the dataset management commands;
    wherein execution of the dataset management commands invalidates data in the range of destination logical addresses, and wherein postponing execution of the other commands until after the dataset management commands are completed avoids the dataset management commands invalidating data written in the range of destination logical addresses by the other commands.

11. The method of claim 10, further comprises:
    determining a range of source logical addresses of the dataset management commands; and
    postponing execution of input-output commands that, when executed, would access the range of source logical addresses, wherein the execution of the input-outcome commands is postponed until after the dataset management commands are completed.

12. The method of claim 10, further comprises:
    using physical-to-logical address mapping to determine whether a physical block in the non-volatile memory maps to the range of destination logical addresses; and
    in response to the physical block not mapping to the range of destination logical addresses, selecting the physical block as a source block for garbage collection.

13. The method of claim 12, further comprises:
    in response to the physical block mapping to the range of destination logical addresses, postponing selecting the physical block as the source block for garbage collection.

14. The method of claim 10, further comprises:
    determining whether a logical address in an entry in a logical-to-physical address translation table stored in a volatile memory of the data storage device is in the range of destination logical addresses; and in response to determining that the logical address is not in the range of destination logical addresses, flushing the entry from the volatile memory to the non-volatile memory.

15. The method of claim 14, further comprises:

in response to determining that the logical address is in the range of destination logical addresses, deferring flushing the entry from the volatile memory to the non-volatile memory.

16. A data storage device comprising:

a memory; and means for:

determining a range of destination logical addresses of copy or dataset management commands in at least one queue;

de-prioritizing other commands in the at least one queue that, when executed, would access the range of destination logical addresses, wherein de-prioritizing the other commands postpones execution of the other commands until after the copy or dataset management commands are completed; and executing the copy or dataset management commands;

wherein execution of the copy or dataset management commands invalidates data in the range of destination logical addresses, and wherein postponing execution of the other commands until after the copy or dataset management commands are completed avoids the copy or dataset management commands invalidating data written in the range of destination logical addresses by the other commands.

17. The method of claim 10, wherein the dataset management commands comprises a trim command.

18. The method of claim 10, wherein the dataset management commands comprises a deallocate command.

19. The method of claim 10, wherein the dataset management commands comprises a logical erase command.

20. The method of claim 10, wherein the at least one queue is in the data storage device.

* * * * *